United States Patent [19]

Walters

[11] Patent Number: 4,854,187

[45] Date of Patent: Aug. 8, 1989

[54] HAND BRAKE ASSEMBLY FOR A VEHICLE

[75] Inventor: John E. Walters, Bulwell, United Kingdom

[73] Assignee: Metallifacture, Ltd., Nottingham, England

[21] Appl. No.: 267,532

[22] Filed: Nov. 4, 1988

[30] Foreign Application Priority Data

Nov. 7, 1987 [GB] United Kingdom ............... 8726133

[51] Int. Cl.[4] .............................. G05G 5/06
[52] U.S. Cl. ................. 74/535; 74/501.5 R; 74/501.6; 74/538; 188/196 B
[58] Field of Search ............ 74/500.5, 523, 501.6, 74/501.5 R, 517, 529, 532, 533, 535, 536, 537, 538, 540, 156; 188/196 B, 2 D, 24.19, 196 F; 192/111 A

[56] References Cited

U.S. PATENT DOCUMENTS 3,187,595 6/1965 Clark .............................. 74/538 X
4,512,210 4/1985 Gurney ....................... 74/501.5 R

FOREIGN PATENT DOCUMENTS 39203 10/1931 France .......................... 74/500.5
2582272 11/1986 France .......................... 74/501.6
1035576 7/1966 United Kingdom ............ 74/523

*Primary Examiner*—Rodney M. Lindsey
*Attorney, Agent, or Firm*—Paul & Paul

[57] ABSTRACT

A self-adjusting hand brake assembly comprises a rack mounting a carriage biased for movement lengthwise thereof in direction by a spring. A pawl on the carriage engages the rack to retain the carriage in position. An anchor member is movable lengthwise of the rack and carriage, and comprises a member to which a brake-operating link is attached. A lever pivotted on the carriage is operable to move the member in direction to apply the brake. The member is retained in position by a pawl engaging the rack, which can be released by a button operating through a linkage to release the brake. The spring is of strength sufficient to take up slack in the brake linkage but insufficient to apply the brakes.

9 Claims, 2 Drawing Sheets

U.S. Patent   Aug. 8, 1989   Sheet 2 of 2   4,854,187
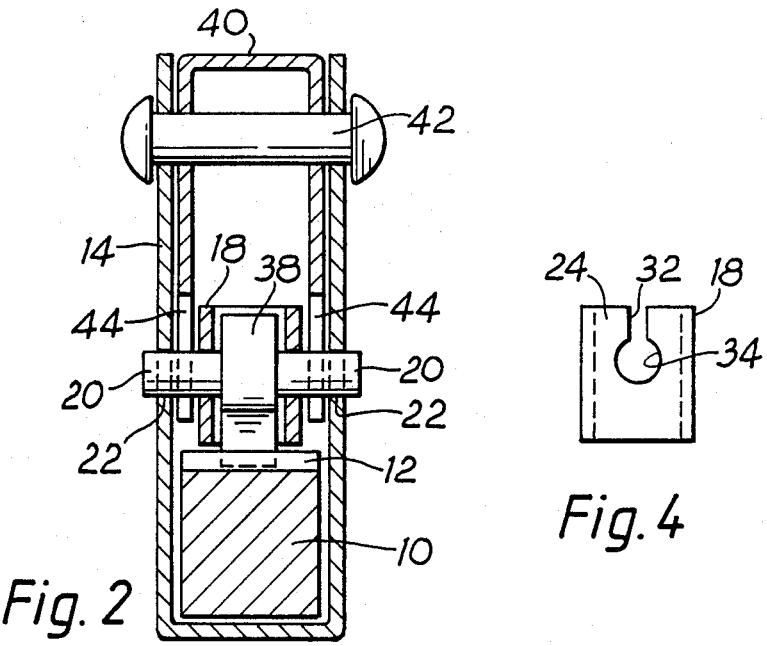
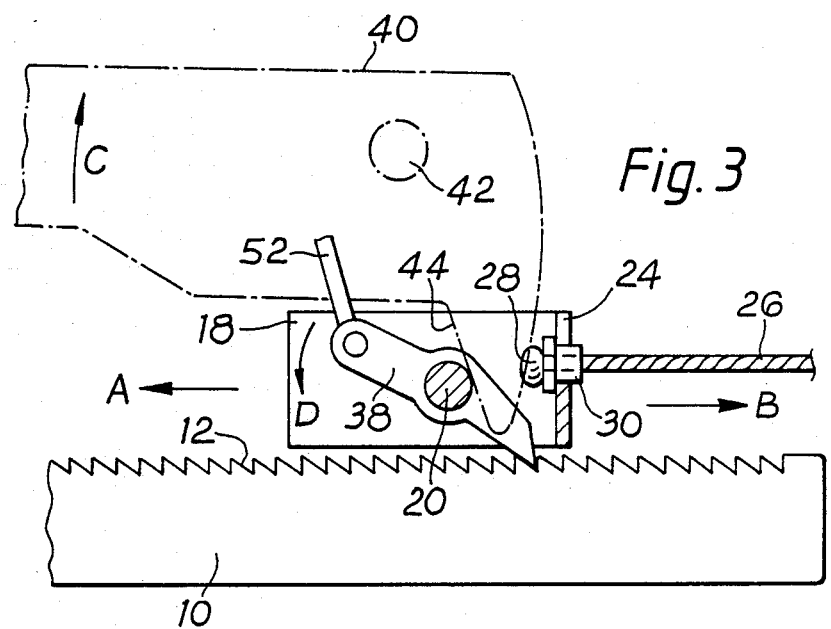

HAND BRAKE ASSEMBLY FOR A VEHICLE

FIELD OF THE INVENTION

This invention is concerned with a hand brake assembly for a vehicle.

Brakes for motor vehicles have commonly been provided with brake operating means comprising a lever attached through a suitable linkage, which may include a brake cable, to the brake mechanism. Such a brake lever is usually held in its operative condition, applying the brakes, by a ratchet mechanism which is normally disengageable by suitable means for example a connecting rod operable from a button located at the end of the lever. This type of hand brake assembly has a number of undesirable features, especially where the linkage includes a brake cable. As sufficient tension to apply the brakes must be created in the linkage, desirably with a single movement of the brake operating means, namely the lever, the lever must be relatively long to provide a satisfactory mechanical advantage. This type of hand brake may also require frequent adjustment for example to take up slack in the linkage, generally arising from stretching of the brake cable, and, possibly, from the wear of the brake pads.

In the heretofore known hand brake assemblies, as the slack in the linkage progressively increases, the amount by which the lever must be moved in order to actuate the brake increases, until adjustment is made to take-up the slack in the linkage. This increased movement is inconvenient when the lever in its operative condition approaches a vertical position: not only is the operating lever more awkward to move to the operative condition but also this increases the risk that the hand brake may be improperly set allowing the vehicle to run away.

SUMMARY OF THE INVENTION

In one aspect the present invention provides a hand brake assembly for a vehicle comprising a base member adapted to be secured to a body of the vehicle, a carriage mounted for sliding movement lengthwise of the base member, a first retaining means mounted on the carriage and biased into operative releasable retaining engagement with the base member, an anchor member mounted on the carriage for sliding movement relative to the carriage and the base member lengthwise of the base member, the anchor member comprising means for attaching a brake operating link thereto, the link being movable lengthwise of the base member in a first direction to apply the brakes and in a second direction opposite the first direction to release the brakes, biasing means adapted in the use of the assembly to urge the carriage in the first direction, the carriage being adapted to urge the anchor member in said first direction with a pre-selected force which is insufficient to apply the brakes but sufficient to take up slack between the attachment of the brake-operating link to the anchor member and the brake, the carriage being retained in the position to which it has been urged by the biasing means by engagement of the first retaining means with the base member, a second retaining means mounted on the anchor member and biased into releasable operative retaining engagement with the base member, and brake-operating means mounted on the carriage and including applying means operable to move the anchor member in said first direction to apply the brakes the anchor member being retained in the position to which it has been moved by engagement of the second retaining means with the base member and release means by which the second retaining means can be released from engagement with the base member to allow the anchor member to move in the second direction to release the brakes.

Preferably the base member is a rack member and the first and second retaining means are first and second pawls normally biased into operative retaining engagement with a rack of the rack member.

With such an arrangement, any slack arising in the operating link is effectively taken up by the biasing means. The amount of movement of the brake-operating means necessary to apply the brake remains substantially constant even when the brake-operating linkage has yielded significantly from its original position, for example when any cable therein has stretched, so that the operating means can be operated efficiently.

BRIEF DESCRIPTION OF THE DRAWINGS

FIG. 2 is a view generally in section on the line II—II of FIG. 1;

FIG. 3 is a view with parts broken away showing an anchor member of the assembly; and FIG. 4 is a view of attachment means.

DESCRIPTION OF THE PREFERRED EMBODIMENT

Figure 1:
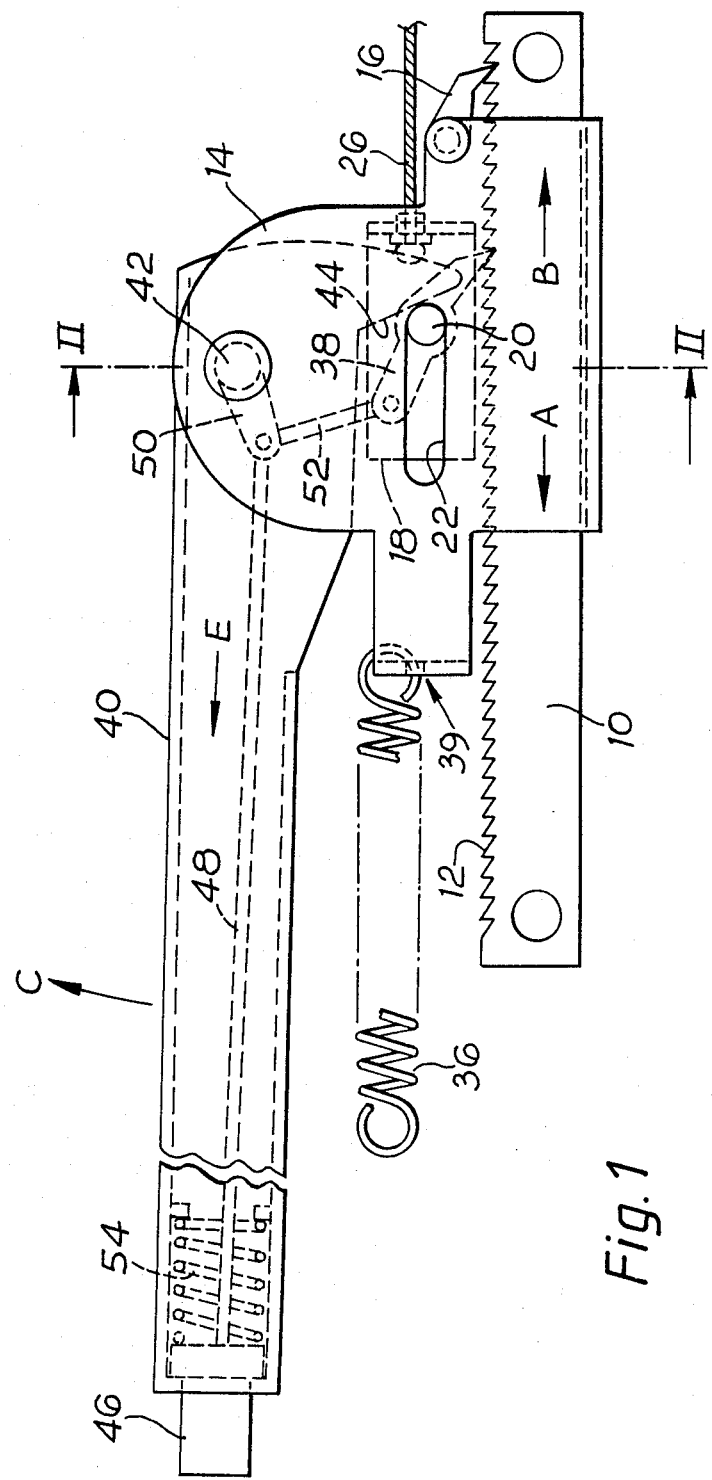
FIG. 1 is a side view of a hand brake assembly embodying the present invention.

The hand brake assembly shown in FIG. 1 for a vehicle comprises a rack member 10 adapted to be secured to a body of the vehicle in an appropriate position and comprises a rack 12 on an upper surface portion thereof. A carriage 14 is mounted on the rack member 10 for sliding movement lengthwise of the rack 12 in the direction indicated by the arrow A on FIG. 1. A first pawl 16 is pivotally mounted on the carriage 14 and biased by means of a spring into operative engagement with teeth of the rack 12.

An anchor member 18 is mounted on the carriage 14 for sliding movement relative to the carriage 14 and the rack 12 lengthwise of the rack 12. The anchor member 18 is constrained to slide with a surface thereof substantially in contact with an upper surface of the rack 12 by a pin 20 slidable in opposed slots 22 formed in opposite side walls of the carriage 14 and extending generally parallel with the rack 12.

The anchor member 18 further comprises attachment means including an end member 24 for attaching a brakeoperating link thereto. The brake-operating link suitably comprises a cable 26 terminating with a head portion 28 and having a collar 30 slidable on the cable 26. The member 24 is provided with a slot 32 through which the cable 26 may be introduced, the slot having a portion 34 of enlarged diameter in which the sleeve 30 is accommodated being retained in the place by engagement of a head portion of the sleeve with the member 24 (to the left viewing FIG. 3). The head of the sleeve 30 is too large to slide through the portion 34 of the slot and the head 28 on the cable 26 is of sufficient diameter to be unable to pass through the hole in the sleeve. The cable 26 is thus attached to the anchor member 18. If desired, alternative attachment means may, however, be utilised. Cable 26 extends from the anchor member 18 in the direction of the arrow B (FIGS. 1 and 3). By movement of the anchor member 18, and thus the cable 26, in a first direction indicated by the arrow A, the brakes are applied. The brakes are released by allowing the cable 26 to move in a second direction, indicated by the arrows B, opposite the first direction.

The embodiment of the invention shown in the drawings further comprises biasing means in the form of a tension spring 36 one end portion of which is secured as indicated by reference 39 to the carriage 14. An end portion of the spring 36 remote from the attachment 39 to the carriage 14 is adapted to be attached to a part of the vehicle body (not shown). Thus, when the assembly is mounted in position in the vehicle body with the spring 36 attached thereto, the carriage 14 is urged in the direction of the arrow A by the spring 36. The carriage 14 is adapted to move the anchor member 18 in the direction of the arrow A as it is urged in that direction by the spring 36 by engagement of the carriage at the end portion of the slots 22 with the pin 20 carried by the anchor member 18. The strength of the spring is selected to be such that the load applied to the anchor member 18 (and through it the brake cable 26 and the brake mechanism) is insufficient to apply the brakes but sufficient to take up any slack in the linkage between the anchor member 18 and the brake mechanism. The carriage 14 is retained in the position to which is has been moved by the spring 36 by engagement of the first pawl 16 with the rack 12.

Whereas the biasing means of the embodiment of the invention shown in the drawings is provided by a spring 36 other biasing means may also be used and may, for example, be arranged to apply a substantially constant force in the direction of the arrow A at a pre-selected level, for example by pneumatic means.

The brake assembly shown in the drawings further comprises a second pawl 38 pivotally mounted on the pin 20 and urged by a spring (not shown) into operative engagement with the teeth of the rack 12. The anchor member need not necessarily, of course, the guided in its movement by the pin on which the second pawl is mounted but may be guided by way other suitable means if desired.

The brake assembly shown in the drawings further comprises brake-operating means mounted on the carriage 14. The brake-operating means comprises a brake lever 40 mounted for pivotal movement about a pivot 42 accommodated in upstanding lugs of the carriage 14. The operating lever 40 comprises applying means operable to move the anchor member 18 in the direction A to apply the brake. In the drawings, the applying means includes a cam face 44 on the lever 40 adapted to engage the pin 20 when the lever is pivoted about the pivot 42 in the direction indicated by the arrow C on FIG. 1 of the drawings. The cam face 44 is effective to move the anchor member 18 in the direction of the arrow A to apply the brake and the anchor member 18 is retained in the position to which it has been moved by engagement of the second pawl 38 with the rack 12. Instead of the cam action used in conjunction with the pin 20 to move the anchor member 18, other means may, if desired, be arranged to effect this movement.

The brake-operating means further comprises release means by which the second pawl 38 can be released from engagement with the rack 12 to allow the anchor member 18 to move in the direction of the arrow B to release the brakes. In the illustrative embodiment, the release means comprises a button 46 mounted to project from an end portion of the lever 40 remote from the pivot 42 and retained in the end portion of the lever by engagement with a suitable abutment. The button 46 is connected to the second pawl 38 through a linkage and is arranged so that on depression of the button 46 by the operator the second pawl is rotated about the pin 20 in the diretion of the arrow D (see FIG. 3) to release the pawl 38 from engagement with the teeth of the rack 12. Linkage comprises a rod 48 pivotally connected at one end to the button 46 and at its other end to a link 50 pivoted for movement about the axis of the pivot 42 and to a link 52 pivotally connected to an arm of the second pawl 38, the rod 48 is normally urged in the direction of the arrow E by biasing means for example a spring 54 mounted to operate between the button 46 and an abutment in the lever 40.

The embodiment of the invention shown in the drawings is such that any slack in the brake linkage between the anchor member 18 and the brake mechanism is taken up by the spring 36, the carriage 14 being locked in the adjusted position by the first pawl 16 engaging the rack 12. Should any yielding of the linkage subsequently arise, the spring 36 will again take up the slack gradually moving the carriage in the direction of the arrow A along the rack member 10 until the force applied by the spring 36 is balanced by the resistance in the brake linkage. The brake assembly is therefore self adjusting. The amount of travel of the lever 40 in the direction of arrow C to apply the brake remains substantially constant irrespective of the position of the carriage 14 along the rack member 10. The rack member may suitably be about 12 cms long thereby allowing a considerable degree of adjustment. The position of the lever 40 in the car will change slightly as any adjustment takes place but there will be no rapid change and the gradually changing position of the lever, should any adjustment arise, can readily be adapted to by a driver. The hand brake assembly is compact and relatively simple. Conveniently the rack member 10 and the operative parts of the carriage 14 may be shrouded in a suitable protective envelope for example a flexible corrugated cover which is able to move with the carriage 14 where it meets the carriage while being anchored to the rack member or the body surrounding the rack member at either end.

I claim:

1. A hand brake assembly for a vehicle comprising a base member adapted to be secured to a body of the vehicle, a carriage mounted for movement lengthwise of the base member, a first retaining means mounted on the carriage and biased into operative releasable retaining engagement with the base member, an anchor member mounted for movement relative to the carriage and the base member lengthwise of the base member, the anchor member comprising means for attaching a brake operating link thereto, the link being movable lengthwise of the base member in a first direction to apply the brakes and in a second direction opposite the first direction to release the brakes, biasing means adapted in the use of the assembly to urge the carriage in the first direction, the carriage being adapted to urge the anchor member in said first direction with a pre-selected force which is insufficient to apply the brakes but sufficient to take up slack between the attachment of the brake-operating link to the anchor member and the brakes, the carriage being retained to the position to which it has been urged by the biasing means by engagement of the first retaining means with the base member, a second retaining means mounted on the anchor member and biased into releasable operative retaining engagement with the base member, and brake-operating means mounted on the carriage and including applying means operable to move the anchor member in said first direction to apply the brakes, the anchor member being retained in the position to which it has been moved by engagement of the second retaining means with the base member and release means by which the second retaining means can be released from engagement with the base member to allow the anchor member to move in the second direction to release the brakes.

2. A hand brake assembly according to claim 1 wherein the base member is a rack member and the first and second retaining means are first and second pawls normally biased into operative retaining engagement with a rack of the rack member.

3. A hand brake assembly according to claim 1 wherein the carriage comprises opposite side walls extending generally parallel with the base member and between which the anchor member is mounted for sliding movement.

4. A hand brake assembly according to claim 3 wherein the anchor member is mounted on the carriage for said sliding movement by a pin slidable in opposed slots in the side walls of the carriage, the carriage being adapted to urge the anchor member in said first direction by engagement with said pin.

5. A hand brake assembly according to claim 1 wherein said second retaining means comprises a pawl pivotally mounted on a pin and spring-urged into retaining engagement with the base member.

6. A hand brake assembly according to claim 1 wherein said biasing means comprises to spring extending between the carriage and part of a vehicle body.

7. A hand brake assembly according to any one of the preceding claims wherein the brake-operating means comprises a lever mounted for pivotal movement on the carriage.

8. A hand brake assembly according to claim 7 wherein the applying means includes a cam face on the lever adapted to engage a part of the anchor member when the lever is pivoted, to move the anchor member in said first direction.

9. A hand brake assembly according to claim 7 wherein the release means comprises a button mounted on the lever connected through a linkage to the second retaining means the construction and arrangement being such that on depression of the button, the second retaining means is released from engagement with the base member.

* * * * *